Figure 1:
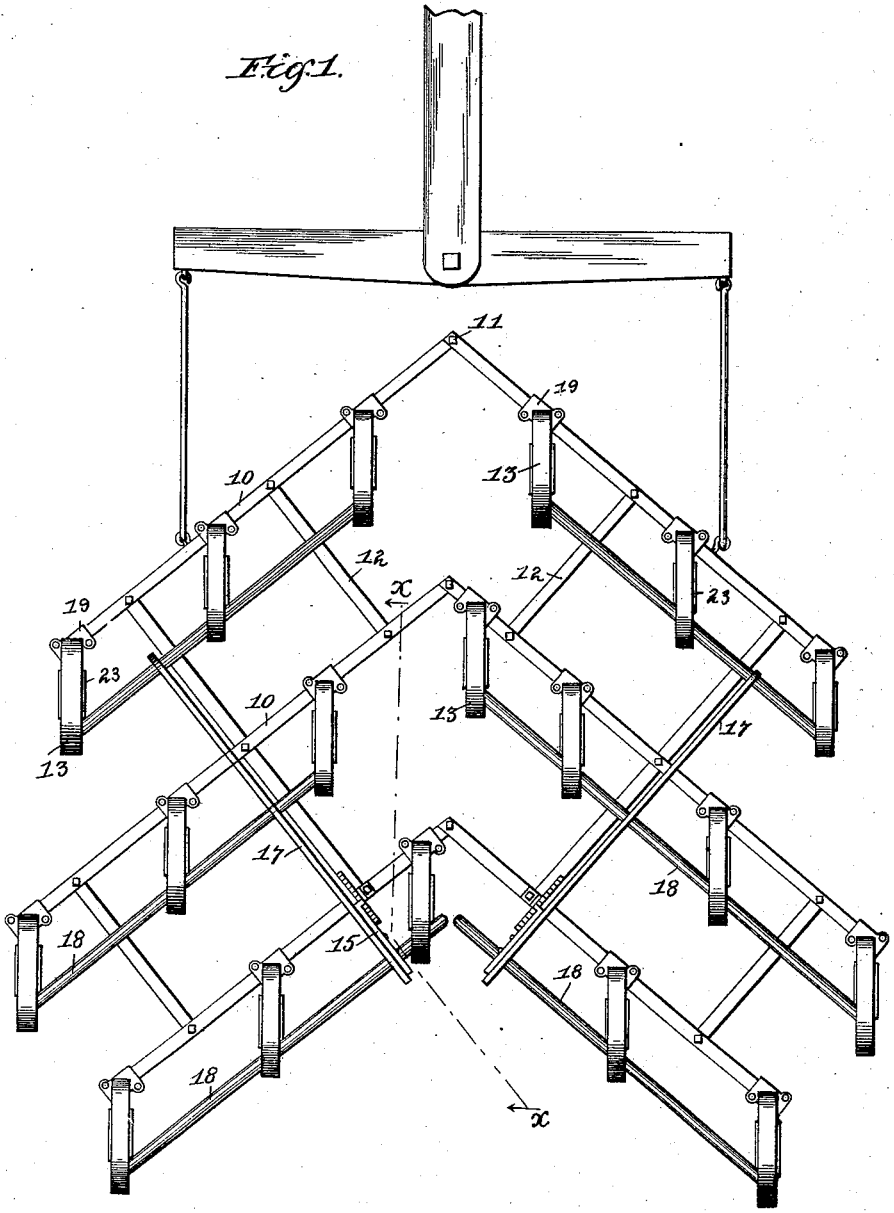

(No Model.) 2 Sheets—Sheet 1.

W. W. GREEN.
HARROW.

No. 491,100. Patented Feb. 7, 1893.

(No Model.) 2 Sheets—Sheet 2.
W. W. GREEN.
HARROW.
No. 491,100. Patented Feb. 7, 1893.
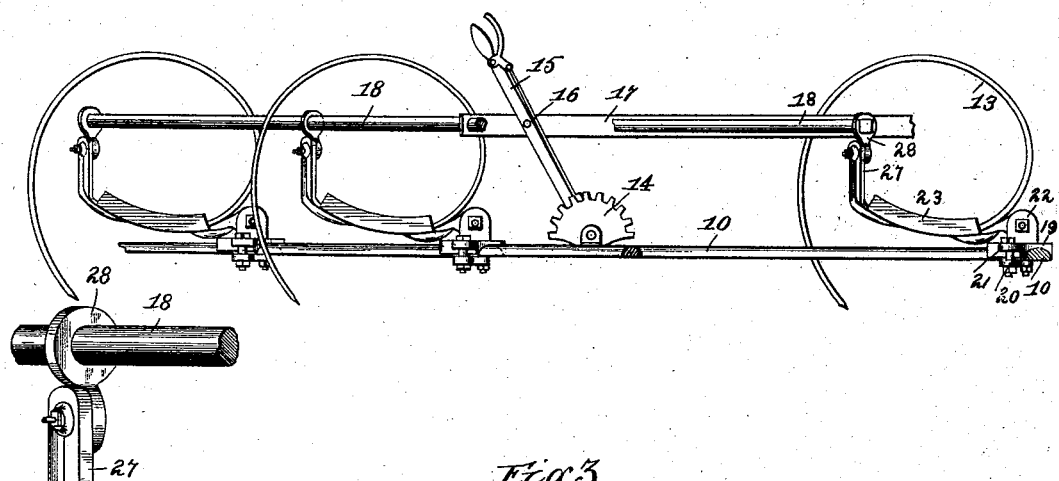
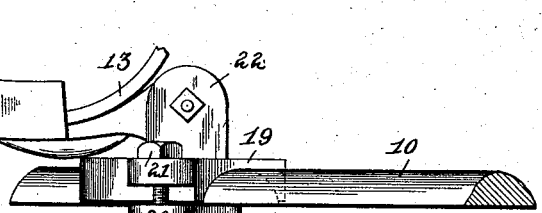
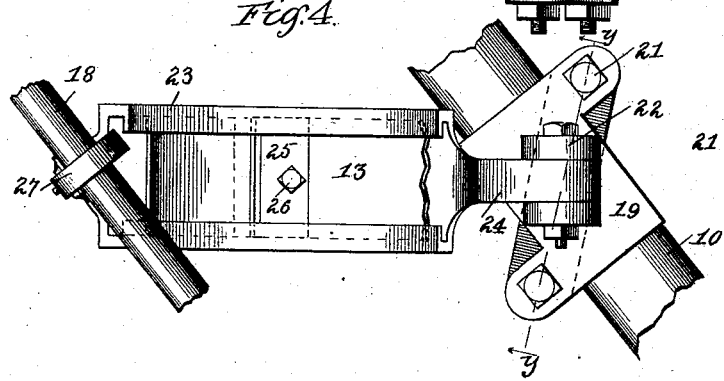
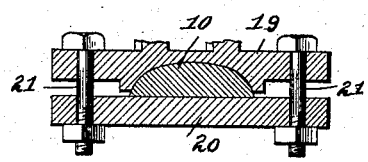
Witnesses:
Wm. M. Rheem.
Wm. F. Henning
Inventor:
William W. Green.
By Charles C. Bulkley,
Atty.

UNITED STATES PATENT OFFICE.

WILLIAM W. GREEN, OF CHICAGO, ILLINOIS, ASSIGNOR OF ONE-HALF TO ALICE V. TERRY, OF BROCKPORT, NEW YORK.

HARROW.

SPECIFICATION forming part of Letters Patent No. 491,100, dated February 7, 1893.

Application filed June 24, 1892. Serial No. 437,918. (No model.)

*To all whom it may concern:*

Be it known that I, WILLIAM W. GREEN, a citizen of the United States, residing at Chicago, in the county of Cook and State of Illinois, have invented certain new and useful Improvements in Harrows, of which the following is a specification.

My invention relates to that class of harrows which is technically termed as of a "butterfly" shape, the distinguishing characteristic of which resides in the extension of the members of the frame diagonally, or at a rearwardly oblique angle relative to a central line of draft, and in which the harrow teeth are positioned upon the said members in such a manner as to be in a plane parallel with said central line of draft.

The design of this my invention is to provide means by which the harrow teeth pivoted to the diagonally and rearwardly extended members of the frame, may be raised and lowered in the operation of the harrow, it being absolutely essential in order to accomplish this result that the linking connecting members between the harrow teeth and the manually operated devices for raising and lowering said teeth should always remain and travel in a plane parallel with the plane of the rearwardly extended frame members, to which latter members the harrow teeth are pivoted and upon which pivot said teeth rotate in describing an arc in the act of raising and lowering the harrow teeth.

To this end my invention consists in diagonally and rearwardly extended members of a harrow frame, upon which members harrow teeth are pivoted or hinged and which teeth are positioned in the plane of the draft and therefore located relatively at oblique angles to the frame members, linking members serving to connect the harrow teeth with the manually operated devices for raising and lowering said teeth, and a pivoted, jointed or hinged connection between the linking members and each of the harrow teeth, so that the latter and the linking members aforesaid by virtue of the pivoted connections between them remain and travel in a plane parallel with the frame members in the act of being raised and lowered, and thus permit and adapt said teeth to be raised and lowered.

In the accompanying detailed description, I will designate what are termed as the manually operated devices, the linking members and the pivoted connections aforesaid, but do not desire it understood that I limit myself in any manner to the specifically described assemblage of elements, although the same constitutes a part of my invention.

My invention has in view certain other objects and consists in certain other features which will be particularly described, pointed out and claimed, reference being now had to the accompanying drawings in which Figure 1 is a plan view of a harrow of the type described showing the various specific devices employed to raise and lower the harrow teeth. Fig. 2 is a sectional view on the line X—X of Fig. 1. Fig. 3 is an enlarged detail view of the devices for holding the harrow tooth, attaching the same to the frame member, and also illustrating the manner in which the harrow tooth is connected with the linking member, being also partly broken away to show the means of adjustably holding the harrow tooth, and also reversed from its usual position. Fig. 4 is also a detail plan view of the portion of the devices shown in Fig. 3. Fig. 5 is a cross sectional view on the line Y—Y of Fig. 4.

The numeral 10 designates the frame members which as shown extend obliquely rearward from the pivoted point of joinder 11. with each other, and constitute the distinguishing feature of the type described, being held in this position by the stay bars 12.

Referring to Fig. 2, I have shown therein, in detail, the manually operated mechanism for raising and lowering the harrow teeth 13, comprising a notched segment 14, secured on one of the frame members. A lever 15, is provided pivotally secured at its lower end which lever is adapted for co-operation with the segment 14. This lever 15 is pivotally secured at 16 to the operating rods 17.

What may be termed the linking members or connections between the harrow teeth and the previously designated manually operated devices consists of bars 18, which are passed through and secured with the operating rods 17, which latter constitute one of the instrumentalities included within that portion of the mechanism designated by the term manually operated devices. These bars 18, as shown in Fig. 1, are disposed parallel with and in the plane of the frame members 10.

Referring now to the means of securing and holding the harrow teeth 13, (Figs. 3, 4, 5) which teeth as shown in Fig. 1 are positioned in the plane of the draft and are therefore at oblique angles relatively to the frame members 10 and the bars 18 constituting the linking members, the numeral 19, designates a securing plate, which plate in connection with the securing plate 20 and the bolts 21 embrace and clasp the frame members 10 at intervals, the plate 19 having the pivotal ears 22.

The harrow tooth holding members consist of a curved sleeve portion 23 into which the shank of the tooth 13 is slipped, and which sleeve 23 is pivotally connected with the ears 22 by the extension 24. I also provide means by which the tooth 13 may be adjustably held within the sleeve 23 consisting of a bearing block 25 secured transversely of and to the sleeve 23 and a set screw 26 acting upon the face of the shank of the tooth. Projecting upwardly from the point of outer termination of the sleeve 23 is a lug or extension 27, perforated at its upper end which lug is positioned at an oblique angle relatively to the tooth holding member as clearly shown in Fig. 4 and in the plane of the frame members 10 and the bars 18.

The pivoted, hinged or jointed connection between the linking members, the bars 18, and the lug 27, or the harrow tooth, consists in a link 28 pivoted to the said lug 27 and also perforated to permit the passage of the bars 18.

I do not desire to be understood as limiting myself to any particular manner of thus pivotally connecting the linking members with the harrow tooth since various differing methods may be adopted.

The operation of my device is as follows: It will be observed upon referring to Fig. 1 that the devices for manually raising and lowering the harrow-teeth are located on each side of the harrow, so that each set of frame members on either side of the center line of draft may be operated independently of each other. By operating the lever 15 the operating rod 17 is raised and carried forward, which in turn causes the bars 18 to travel upwardly and forwardly; also causing the link 28 and upper end of lug 27 to describe an upward and forward arc which raises the harrow teeth 13 held in the sleeve 23. In order to accomplish this operation of raising and lowering it is absolutely essential that the linking members 18 when describing an upward and forward arc should always be in the same plane relative to the frame members 10, that is parallel therewith; and in order to accomplish this latter result the linking members must be permitted a lateral movement, which end is attained in this my invention by means of the hinged, pivoted or jointed connection between the linking members and the frame members. It will be further observed that the harrow teeth may be adjusted and held in varying position to compensate for wear or other causes.

It will now be apparent that in my invention the harrow teeth may be readily raised and lowered, and thus a varying character of soil, either hard or soft, harrowed with the best results and with greater facility, since the pitch of the harrow teeth may be at any time readily varied.

Whenever in the following claims the harrow teeth are referred to as being pivoted to the frame it is intended to refer to the harrow teeth as being directly pivoted thereto or to the devices or means of holding the said teeth pivoted to the frame members.

Having thus described my invention what I claim as new and desire to secure by Letters-Patent is:

1. In a harrow, the combination of rearwardly and obliquely extended frame members, harrow teeth having a pivoted or hinged connection with said frame members, linking members between the harrow teeth and the manually operating devices for raising and lowering and adjusting the teeth, and a joint connection between the said harrow teeth and the linking members, whereby the latter in describing an arc remain in parallelism with the frame members.

2. In a harrow the combination of rearwardly and obliquely extended frame members, harrow teeth having a pivoted or hinged connection with said frame members, rearwardly and obliquely extended linking members joining the harrow teeth adjustably with manually operated mechanism for raising and lowering and adjusting the teeth, and a joint connecting member between each of the linking members and each of the harrow teeth, said joint connecting members providing means by which the linking members are maintained parallel with the frame members in describing an upward arc in raising and lowering the harrow teeth.

3. In a harrow the combination with rearwardly and obliquely extended frame members, of tooth holding members pivoted or hinged upon the frame members, teeth secured thereon and detachable therefrom, manually operated devices for raising and lowering and adjusting the teeth, linking members secured to and operated by the manually operated devices, and a joint connection between the linking members and the separable teeth holding members.

4. In a harrow the combination with rearwardly and obliquely extended frame members, of teeth-holding members, separable from said teeth, pivoted or hinged on said frame members and extended in the plane of the draft, and which said members have upwardly extended lugs or projections so positioned as to be parallel with the frame members manually operated devices for raising and lowering the harrow teeth, linking members connected to said devices and extended parallel with the frame members, and a jointed, hinged or pivoted connection between the linking members and the said projections of the teeth holding members.

5. In a harrow the combination of rearwardly and obliquely extending frame members, holding devices pivoted or hinged to the frame members, harrow teeth secured to and carried by said holding devices, upward extensions also secured to the said tooth holding devices, which extensions are positioned angularly and in the plane of the frame members, manually operated devices for raising and lowering the harrow teeth, linking members secured with the manually operated devices and a pivoted, jointed or hinged connection between said upward extensions and the linking members.

In testimony whereof I have hereunto set my hand, in the presence of two witnesses, this 17th day of June, 1892.

WILLIAM W. GREEN.

Witnesses:
W. F. BERNBROCK,
C. C. BULKLEY.